Feb. 3, 1953 G. SMITH 2,627,402
SNUBBED SPRING GROUP
Filed Aug. 30, 1950 2 SHEETS—SHEET 1

INVENTOR.
Goff Smith
BY

Feb. 3, 1953 G. SMITH 2,627,402
SNUBBED SPRING GROUP
Filed Aug. 30, 1950 2 SHEETS—SHEET 2
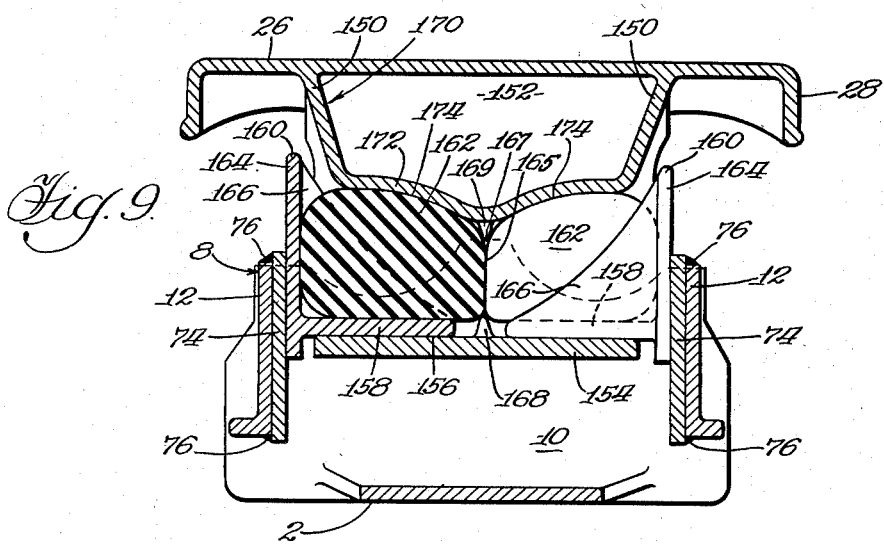
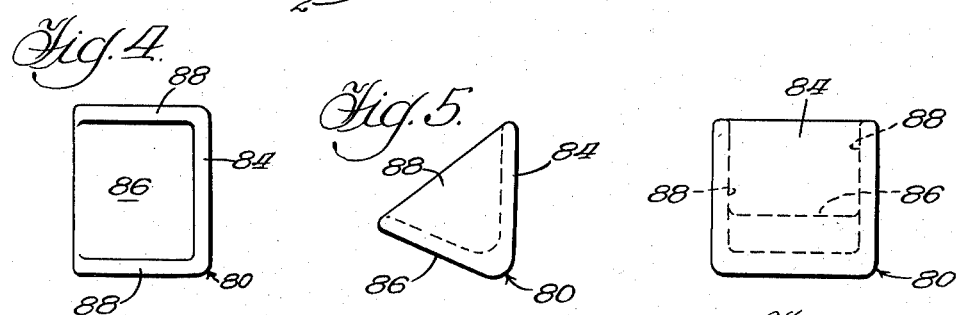
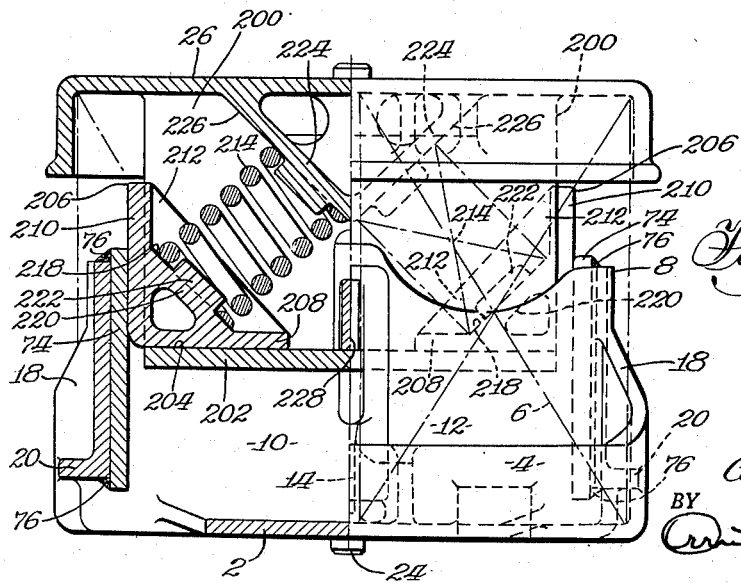
INVENTOR.
Goff Smith Patented Feb. 3, 1953

2,627,402

UNITED STATES PATENT OFFICE 2,627,402

SNUBBED SPRING GROUP

Goff Smith, Riverside, Conn., assignor to American Steel Foundries, Chicago, Ill., a corporation of New Jersey Application August 30, 1950, Serial No. 182,288

15 Claims. (Cl. 267—9)

1

This invention relates to spring groups.

A general object of the invention is to provide a spring group incorporating a novel friction device of simple design and adequate strength for long life in service.

A more specific object of the invention is to devise a spring group having top and bottom plates with springs therebetween and telescoping followers integrally united with the plates, wherein the followers are of special form designed to distribute the material in such a manner without encroaching on the available spring space, as to produce the necessary strength at the particular points which experience has proved are most apt to yield when subjected to the severe stresses encountered in railway service.

A further object of the invention is to design a friction assembly comprising a follower or friction casing receiving another follower or carrier therein, the carrier supporting shoes and enclosing actuating springs for the shoes, the actuating springs being oriented to deliver forces against the shoes in a direction into the casing so as to tightly engage the shoes with the carrier and with friction surfaces within the casing and to maintain the shoes in upright position throughout the operating range of the friction device whereby the shoes are prevented from fulcruming against the outer edges of the friction casing such as would result in unstable action and rapid localized wear on the shoes and outer edges of the friction casing.

Certain embodiments of the invention contemplate the use of springs of resilient material such as rubber for actuating the shoes whereby several force vectors are applied to the shoes to obtain direct pressures for maintaining the shoes in engagement with the carrier and the friction surfaces of the friction casing.

In one embodiment means is afforded for transmitting pressures between the resilient members actuating the individual shoes.

These and other objects of the invention will become more apparent from the specification and the drawings, wherein.

2

Figures 1, 2, 3, 7, 8:
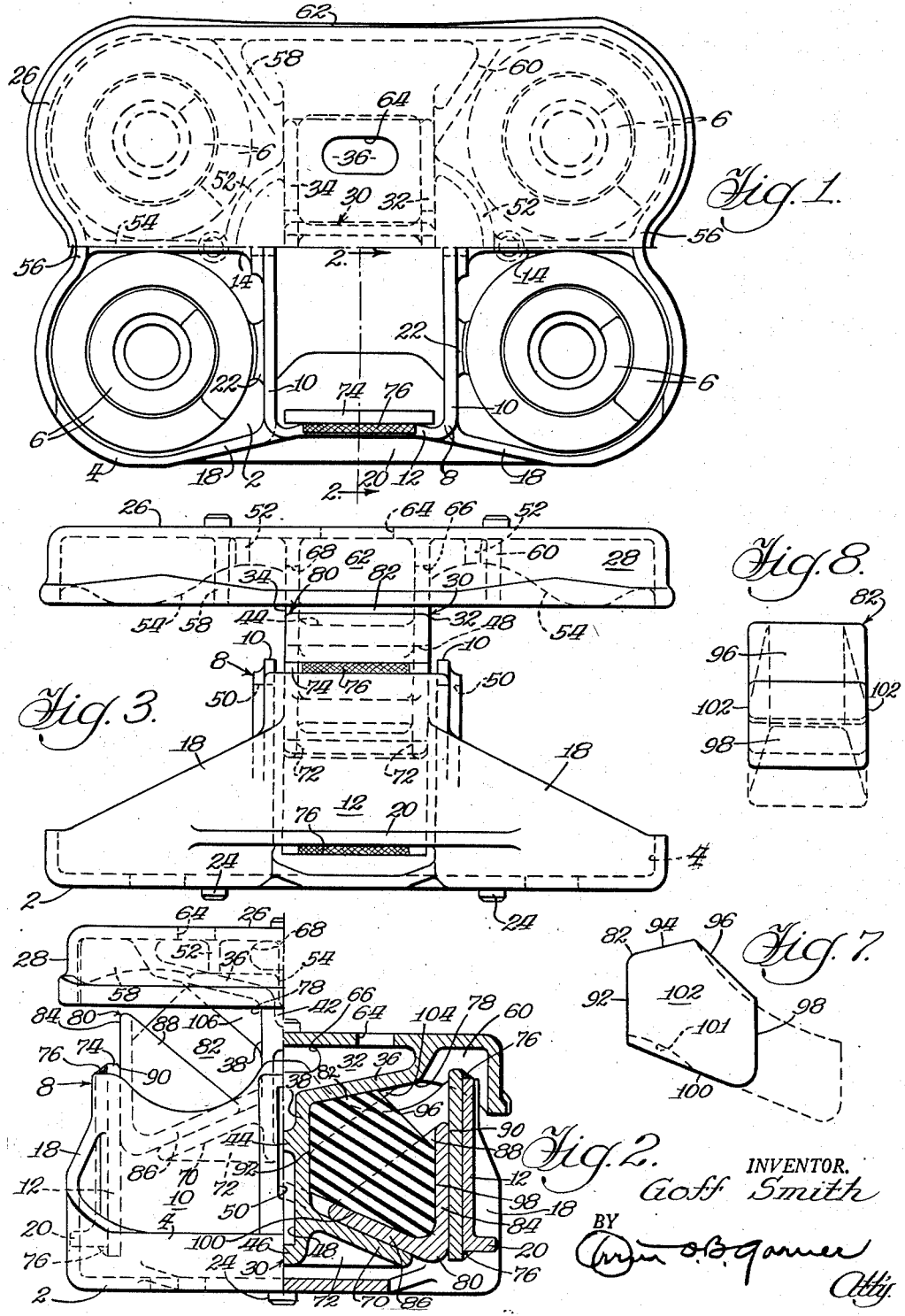
Figure 1 is a top plan view of one form of the invention, one half of the top plate and friction assembly carried thereby being removed to more clearly illustrate the construction of the bottom plate and follower.
Figure 2 is an end view, partly in section, the section being taken substantially on the line 2—2 of Figure 1, the left half showing the spring group expanded and the right half compressed.
Figure 3 is a side elevational view with the load springs omitted.

Figure 4 is a top plan view of a shoe, Figure 5 a side elevational view thereof and Figure 6 a front view thereof.

Figure 7 is a side elevational view of a resilient block, the expanded condition being shown in phantom lines; and Figure 8 is a front view thereof.

Figure 9 is a cross sectional view of another form of the invention, the section being comparable to that of Figure 2, and Figure 10 is an end elevational view, partly in section, of another form of the invention, the section being taken substantially in a vertical plane bisecting the spring group transversely.

Describing the invention in detail and referring first to the embodiment shown in Figures 1 through 8, the spring group comprises a bottom plate 2 provided with an upstanding peripheral flange 4 contoured to surround a plurality of sets of coil springs 6 located at the four corners of the plate. It will be understood that the group may be inverted with the bottom plate at the top.

A rectangular friction casing, generally indicated 8, is formed on top of plate 2 and interposed between the sets of springs at opposite ends of the spring group, the casing comprising spaced side walls 10, 10 and interconnecting end walls 12, 12. The external sides of walls 10, 10 are strengthened intermediate their ends by ribs 14, 14 located between adjacent sets of springs and formed integral with the bottom plate and adjacent portion of flange 4. The end walls join with portions 18, 18 of the flange 4 which converge inwardly toward the center of the spring group, and the external sides of the portions 18, 18 are reinforced by a substantially horizontal gusset 20 which also merges with the lower edge of the related end wall 12. The side walls 10, 10 are provided adjacent each end with bosses 22, 22 for positioning the adjacent spring unit 6.

The bottom of the plate has spaced dowels 24, 24 for insertion into complementary openings in a spring plank or spring seat of a railway car truck side frame.

The upper ends of the springs 6 seat against the underside of a top plate 26 having a depending peripheral flange 28 surrounding the coils for positioning the same.

A depending friction shoe support or carrier, generally indicated 30, is formed centrally on the top plate, the carrier telescoping into the friction casing 8. The carrier comprises substantially parallel side walls 32 and 34 which extend generally parallel to the walls 10, 10. The upper ends of the walls 32 and 34 merge with the bottom side of the top plate 26. The extent of walls 32 and 34 transversely of the top plate is slightly less than that of the walls 10, 10 as will be readily noted in Figure 2. The lower edges of the side walls 32 and 34 are diagonal and converge downwardly toward the center of the carrier. The side walls 32 and 34 are interconnected intermediate their top and bottom edges at opposite sides of the central axis of the support by transverse downwardly converging diagonal webs 36, the upper end of each diagonal web 36 being turned upwardly at a more pronounced angle and merging with the adjacent ends of walls 32 and 34 at its lateral edges and at its upper edge with the bottom side of the top plate 26. The lower edges of the webs 36, 36 merge with the upper ends of substantially vertical transverse walls 38, 38 which are spaced transversely of the spring group. The upper ends of the walls 38, 38 join the lower ends of the walls 32 and 34 adjacent to the apex of convergence of the lower edges of said walls 32 and 34. The walls 38, 38 are interconnected adjacent to their upper ends by a generally horizontal web 44 which also merges with the lower ends of the walls 32 and 34. The lower ends of the walls 38, 38 are interconnected by a bottom generally horizontal web 46.

The walls 38, 38 and webs 44 and 46 define a vertically elongated slot 48 alignable with vertically elongated slots 50, 50 formed centrally transversely in the walls 10, 10. The slots 50, 50 and 48 are adapted to receive a locking bar (not shown) therethrough for maintaining the spring group in assembled relationship such as during shipping or assembly with a car truck.

Each side wall 32 and 34 is joined at its external side adjacent to each end with a leg of a U-shaped reinforcing rib 52 formed integral with the underside of the top plate and bowed away from the associated side wall of the top follower. Each rib 52 is joined at the center thereof to the inner end of a depending rib 54 on the underside of the top plate, the outer end of rib 54 merging with an inwardly bowed portion 56 of flange 28. The external side of wall 34 is connected adjacent each end to a rib 58 and similarly each end of wall 32 is connected to a rib 60, the ribs 58 and 60 at adjacent ends diverging away from the carrier and being formed integral with the underside of the top plate and at their inner ends merging with the respective side walls and at their outer ends merging with the internal side of an adjacent portion 62 of the flange 28, the portions 62 extending along the sides of the top plate and the portions 56 being located at the ends of the top plate.

It will be readily seen from a consideration of Figures 1 and 2 that the connection between the follower and the top plate is not localized but is spread out across substantially the entire extent of the top plate. The ribbing and webbing is arranged as not to interfere with the spring space or the operation of the friction device. The arrangement of the ribbing provides exceptional strength and utilizes extensive areas of the top plate to effect a juncture with the top follower which assures a sound metallurgical condition.

In order to lighten the structure and also provide for good foundry practice, the top plate is cored away as at 64, 64 adjacent the ends of the side walls 32 and 34, the openings being located centrally between said side walls 32 and 34. For the same reasons the central portions of the side walls 32 and 34 may be cored away with transverse openings 66 and 68 respectively, the openings 66 and 68 being located substantially centrally of the spring group and immediately below the top plate 26 and spaced a substantial distance from the lower edges of the side walls 32 and 34.

The lower end of the top follower is formed at opposite sides thereof with downwardly diverging wedge walls 70, 70, said walls merging at their upper inner ends with the respective walls 38, 38 adjacent to the lower ends thereof. The juncture between each wall 70 and associated wall 38 is reinforced by spaced triangular gussets 72, 72 which are located at opposite edges of wall 70, the gussets 72, 72 merging at their upper ends with the related wall 70 and at their inner edges with the lower extremities of the related wall 38.

Each wall 70 slopes downwardly toward the associated end wall 12 of the friction casing and each wall 12 supports a friction plate 74 on its inner side, the plate 74 being suitably secured to wall 12 in any convenient manner such as by welding at 76, 76 of the top and bottom edges of plate 74 to the top and bottom edges of the wall 12.

Each wall 70 and associated walls 38 and 36 form a pocket 78 in the related side of the top follower, the pocket receiving a friction shoe 80 therein and an actuating spring 82 therefor.

The shoe is shown in detail in Figures 4 to 6 and is a hollow structure substantially in the form of an isosceles triangle in side elevation. The shoe comprises a front or friction wall 84, a bottom wedge wall 86, which slopes downwardly and joins with the lower end of wall 84. The walls 84 and 86 are joined at their lateral edges by spaced side webs 88, 88.

The wall 86 engages on its bottom side with the top side of the associated wall 70 and the wall 84 engages on its forward side as at 90 with a friction surface on the associated friction plate 74. The shoe 80 is constantly urged downwardly into the casing to its wedged position by the spring 82 which in the present modification is shown as a block of resilient material such as rubber.

The shape of the block 82 is best seen in Figures 7 and 8, wherein it will be noted, that the rear end of the block is formed with a substantially flat vertical rear surface 92 which is adapted to engage with the associated wall 38. The upper end of surface 92 merges into the lower end of a diagonal surface 94 which slopes downwardly rearwardly of the block, the surface 94 being adapted for engagement with the underside of the associated web 36. The upper end of surface 94 merges with the upper rear extremity of a diagonal top surface 96 of the block, said surface 96 in the expanded condition of the block 82 being curved downwardly. The lower end of surface 96 merges with a substantially vertical surface 98 at the forward end of the block, the surface 98 seating against the rear side of the front wall 84 of the shoe. The surface 98 merges at its bottom end with the lower end of an upwardly sloping diagonal bottom surface 100 of the block, the surface 100 seating against the top side of web 86 of the shoe. The surface 100 meets the lower end of surface 92 of the block. It will be seen that in the expanded position of the block 82 the lower surface 100 is substantially flat from its forward end to adjacent its rear end and is then curved as at 101 upwardly and merges at its rear extremity with the surface 92 which is generally flat. This curvature of the top and bottom surfaces 96 and 100 of the resilient block is designed to accommodate bulging of the block when it is compressed to its state as shown in solid lines in Figure 7 and in Figure 2. The opposite sides 102, 102 of the block are substantially flat and they converge upwardly in the expanded condition of the block, as seen in dotted lines.

It will be seen that the block extends lengthwise diagonally downwardly from the carrier and exerts a principal force diagonally downwardly toward the apex of the shoe 80.

It will be seen that the upper end of each block is received between portions 104 and 106 of the side walls 32 and 34 below the walls 36, and the lower end of each block fits into the related shoe between the side walls 88, 88 thereof.

Referring now to the embodiment shown in Figure 9, wherein the parts which are identical with those of Figures 1 to 8, are identified by corresponding reference numerals, the top follower 150 comprises a side wall 152 at each side thereof, each side wall extending into the friction casing 8 in adjacent relationship to the side walls 10 of the casing. The bottom ends of these side walls 152 of the top follower are interconnected by a substantially flat horizontal wall 154 which provides a generally flat friction surface 156 on the top side thereof against which a bottom wall 158 of each friction shoe 160 seats. Each shoe is substantially similar to that shown in the previous embodiment with the exception that the bottom wall 158 of each shoe 160 extends horizontally whereas the bottom wall 86 in the previous embodiment extends diagonally. In the present embodiment each shoe is actuated by a block of resilient material 162, the block engaging at its front end the rear side of a substantially vertical friction wall 164 of the associated friction shoe and on its bottom side the top side of a bottom wall 158 of the associated shoe. The wall 158 merges with the wall 164 of the shoe adjacent the bottom thereof. The walls 164 and 158 are interconnected by substantially triangular side walls 166, 166 between which fits the forward end of the related spring 162. The rear ends of the springs 162, 162 abut each other as at 165 through an opening 167 between ribs 168 and 169 extending transversely of the side walls 152 of the carrier and interconnecting the same. Rib 168 is integral with the top side of the bottom wall 154.

The upper edge of the rib 169 merges with the bottom side of a central portion of an abutment wall 170, the major portion of which is located intermediate the top and bottom edges of the side walls 152 and interconnects the same. Wall 170 has a portion 172 at its bottom extending across the width of the walls 152 and providing at opposite sides of the rib 169 upwardly diverging curved spring seat portions which on their bottom sides provide seats as at 174, 174 for the upper ends of the respective blocks 162, 162. The outer ends of the spring seat portions are turned sharply upwardly and merge with the bottom side of the top plate 26. It will be seen that a transmission of forces is obtained between the blocks 162, 162 at opposite sides of the carrier and that each block also delivers horizontal, vertical and downwardly directed diagonal forces against the associated shoe.

It will be noted that this construction also spreads out the connections with the top plate.

Referring now to the embodiment shown in Fig. 10, wherein parts corresponding to those in the previous embodiments are identified by corresponding reference numerals, the bottom plate construction together with the friction casing is identical with that in the previous embodiments. The top plate construction and friction assembly, however, has been slightly modified to incorporate coil springs in lieu of the resilient blocks. In the present embodiment the top plate is formed centrally thereof with a top follower comprising spaced depending side walls 200, 200, joined at their lower ends by a substantially horizontal transverse wall 202 providing on its top side a friction surface 204. Friction shoes 206, 206 are positioned at opposite sides of the follower adjacent each friction plate 74 on the friction casing 8. Each shoe is substantially triangular in side elevation and comprises a generally horizontal bottom wall 208 joined at its forward edge with the bottom end of a substantially vertical friction wall 210. Walls 208 and 210 are joined at their lateral edges by substantially vertical side walls 212, 212 which form a pocket for reception of the lower end of a diagonally positioned coil spring 214. The spring 214 seats at its lower end as at 218 against a transverse spring seat web 220 which extends diagonally across the corner of the juncture between the walls 208 and 210 of the shoe. The web 220 is provided with a spring positioning boss 222. It will be seen that the springs 214, 214 at opposite sides of the carrier converge upwardly and actuate the respective shoes downwardly into the casing against the surface 204 and outwardly against the related friction plate 74.

The upper ends of the side walls 200, 200 of the top follower are interconnected intermediate their lateral edges by transverse webs 224, 224 positioned at opposite sides of the transverse center plane of the carrier. The webs 224, 224 converge downwardly and are joined at their lower ends to each other in an area approximately medially between the top and bottom edges of the side walls and substantially centrally between the lateral edges of the side walls. The upper ends of the webs 224, 224 merge with the bottom side of the top plate 26. The outer sides of the webs 224, 224 provide spring seat surfaces 226, 226 for seating the upper ends of the respective springs 214. It will be seen that related surfaces 226 and 218 are substantially parallel and that the springs exert generally horizontal and vertical components to urge the shoes downwardly against the web 202 and outwardly against the respective plates 74.

The side walls 200, 200 and side walls 10, 10 are provided with transverse apertures adapted to receive a locking bar 228 therethrough for interlocking the top and bottom plate assemblies in temporary assembled relationship. It will be understood that the locking bar is removed when the device is placed in service, such as between the bolster and the spring seat of a side frame of a railway car truck.

I claim:

1. In a spring group, top and bottom spring plates, friction surfaces on the bottom plate, a follower on the top plate, extending between the surfaces, spring seats on the top plate converging toward the bottom plate, a friction shoe in engagement with each surface, each shoe and said follower engaging each other along a face angularly related to the adjacent surface, and resilient means reacting between each spring seat and related shoe, each resilient means being oriented to deliver a force against the related shoe toward the apex of the planes of the surface and face engaged by the shoe.

2. In a spring group, top and bottom spring plates, coil springs confined therebetween, a friction casing on the bottom plate comprising a pair of opposed internal substantially vertical friction surfaces, a carrier integral with said top plate and extending into said casing, said carrier having pockets at opposite sides thereof, a friction face at the bottom of each pocket extending angularly to the adjacent surface, spring seats on the top plate converging toward the bottom plate, a shoe within each pocket in engagement with the face and adjacent surface, and spring means in each pocket compressed between the related shoe and spring seat, said spring means being oriented to deliver forces in downwardly diverging planes.

3. A spring group comprising top and bottom plates, coil springs confined therebetween and a friction device centrally of said group comprising telescoping inner and outer followers connected to said top and bottom plates respectively, friction shoes carried by said inner follower at opposite sides thereof, spring seats on the inner follower converging toward the outer follower, and resilient means within said inner follower and compressed between the shoes and said spring seats, said resilient means being oriented to urge said shoes against the inner end of said inner follower and outwardly against the outer follower.

4. A spring plate comprising a substantially flat section, a friction shoe carrier formed centrally on said flat section and comprising spaced side walls extending from one side of said plate substantially parallel to each other, said side walls being interconnected intermediate their ends by diagonal walls converging away from said flat section, said diagonal walls merging at one of their ends with said flat section, transverse walls connected at one of their ends to the other ends of said diagonal walls, said transverse walls interconnecting said side walls at their ends remote from said plate, said transverse walls extending substantially perpendicular to said section, an inner web generally parallel to said section interconnecting said side walls and interconnecting said transverse walls, an outer web substantially parallel to said section and interconnecting said transverse walls at their ends remote from said section, and wedge walls extending from said transverse walls adjacent said outer web, said wedge walls diverging away from said section.

5. In a spring group, spaced friction plates, load carrying springs therebetween, a friction device comprising telescoping inner and outer followers between said plates and connected to respective plates, friction surfaces on the interior of the outer follower, friction faces on the inner end of the inner follower, and perpendicular to said friction surfaces, friction shoes at opposite sides of the inner follower and in engagement with the adjacent face and surface, a spring seat on the inner follower adjacent each face and facing toward the same, said spring seats converging toward the outer follower, and resilient means compressed between each shoe and adjacent seat to maintain the shoes in frictional engagement with their related faces and surfaces.

6. In a spring group, top and bottom plates, a casing on the bottom plate having internal friction surfaces at its ends, a shoe casing on the top plate telescoped into the carrier, a pocket in the carrier adjacent each surface and comprising a friction face at the bottom thereof angularly related to the adjacent surface, a shoe in each pocket in complementary engagement with the associated face and adjacent surface, and a spring in each pocket having one end in the related shoe, each spring extending rearwardly and upwardly of the related shoe, and a spring seat in each pocket upwardly of the shoe against which the other end of the adjacent spring seats, each spring exerting a force diagonally with respect to the adjacent face and surface.

7. A spring group, according to claim 6, wherein each spring also exerts forces vertically and horizontally.

8. A spring group, according to claim 6, wherein each spring comprises a block of rubber under constant compression.

9. In a friction device telescoping inner and outer followers, said inner follower having pockets at opposite sides thereof and a transverse friction surface at the bottom of each pocket, said outer follower presenting friction surfaces extending axially of said device, a spring seat in each pocket adjacent to the outer end of the inner follower, said spring seats converging toward the inner end of said inner follower, a friction shoe in each pocket in engagement on adjacent sides with the friction surface therein and with the friction surface on said outer follower, and a spring in each pocket compressed between the shoe and the spring seat therein, said springs exerting forces diverging toward the inner end of said inner follower.

10. A friction device, according to claim 9, wherein each spring abuts the other to transmit forces therebetween.

11. A spring group, according to claim 9, wherein said spring seats curve toward the outer end of said inner follower and are located substantially medially between the inner and outer ends of said follower.

12. A spring group, according to claim 9, wherein said spring seats are located intermediate the ends of said inner follower.

13. A spring group, according to claim 9, wherein said spring seats are disposed intermediate the ends of said inner follower and a portion of each spring seat extends substantially axially of the friction device.

14. In a spring group, a spring plate comprising a substantially flat section, a friction shoe carrier formed centrally on said flat section and comprising spaced side walls extending from one side of said plate substantially parallel to each other, said side walls being interconnected intermediate their ends by diagonal walls converging away from said flat section, said diagonal walls merging at one of their ends with said flat section, transverse walls connected at one of their ends to the other ends of said diagonal walls, said transverse walls interconnecting said side walls at their ends remote from said plate, said transverse walls extending substantially perpendicular to said section, an inner web generally parallel to said section interconnecting said side walls and interconnecting said transverse walls, an outer web substantially parallel to said section and interconnecting said transverse walls at their ends remote from said section, and wedge walls extending from said transverse walls adjacent said outer web, said wedge walls diverging away from said section, said side walls, transverse walls, diagonal walls and wedge walls defining pockets at opposite sides of the spring plate, a friction casing having spaced internal friction surfaces, a friction shoe in each pocket engaging its related friction surface and wedge wall, and a spring in each pocket urging its respective shoe against its related friction surface and wedge wall.

15. In a spring group, spaced friction plates, load carrying springs therebetween, a friction device comprising telescoping inner and outer followers between said plates and connected to respective plates, friction surfaces on the interior of the outer follower, friction faces on the inner end of the inner follower and perpendicular to said friction surfaces, friction shoes at opposite sides of the inner follower and in engagement with the adjacent face and surface, a spring seat on the inner follower adjacent each face and facing toward the same, said spring seats converging toward the outer follower, and resilient means compressed between each shoe and adjacent seat to maintain the shoes in frictional engagement with their related faces and surfaces, said inner follower comprising spaced side walls joined at their outer ends with the related plate, and ribs connected to the lateral edges of the side walls, adjacent ribs diverging toward the lateral edges of the related plate, said last-mentioned plate having a peripheral flange, and said ribs being integral with the last-mentioned plate and at their outer ends merging into the inner side of the flange.

GOFF SMITH.

REFERENCES CITED

The following references are of record in the file of this patent:

UNITED STATES PATENTS

| Number | Name | Date |
| --- | --- | --- |
| 2,356,742 | Bachman | Aug. 29, 1944 |
| 2,356,743 | Light | Aug. 29, 1944 |
| 2,378,229 | Light | June 12, 1945 |
| 2,437,359 | Pierce | Mar. 9, 1948 |
| 2,446,506 | Barrett et al. | Aug. 3, 1948 |
| 2,483,181 | Clasen | Sept. 27, 1949 |
| 2,483,375 | Tack | Sept. 27, 1949 |
| 2,485,971 | Light | Oct. 25, 1949 |